July 1, 1952  W. J. DE REAMER  2,601,815
DIE FOR MOLDING PULP ARTICLES
Filed Dec. 14, 1945  3 Sheets—Sheet 1

Inventor
William J. De Reamer
by Arthur W. Nelson
Atty.

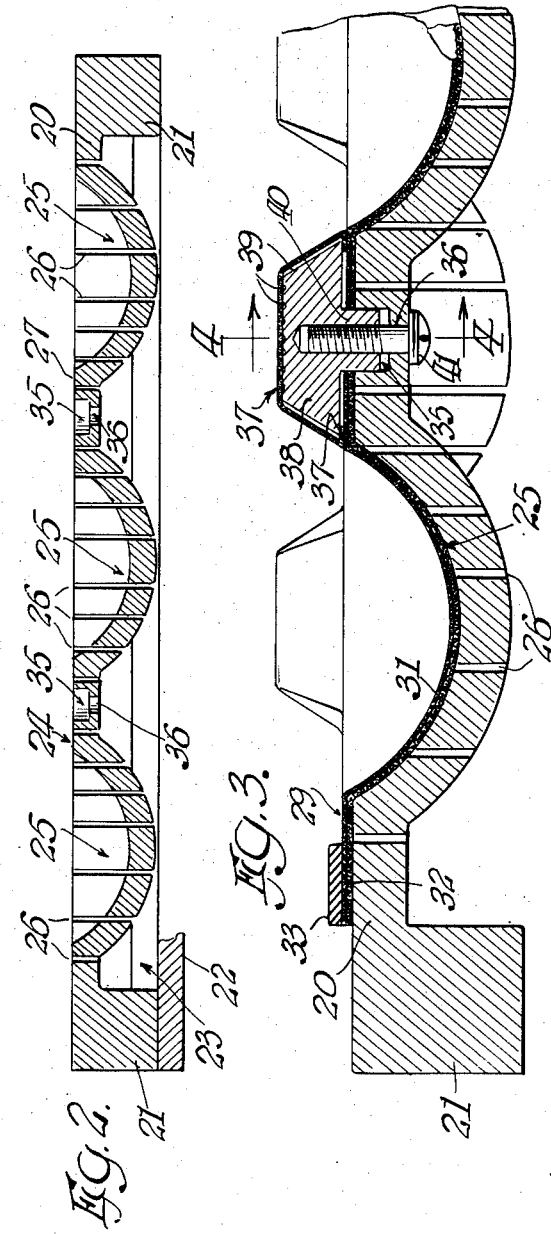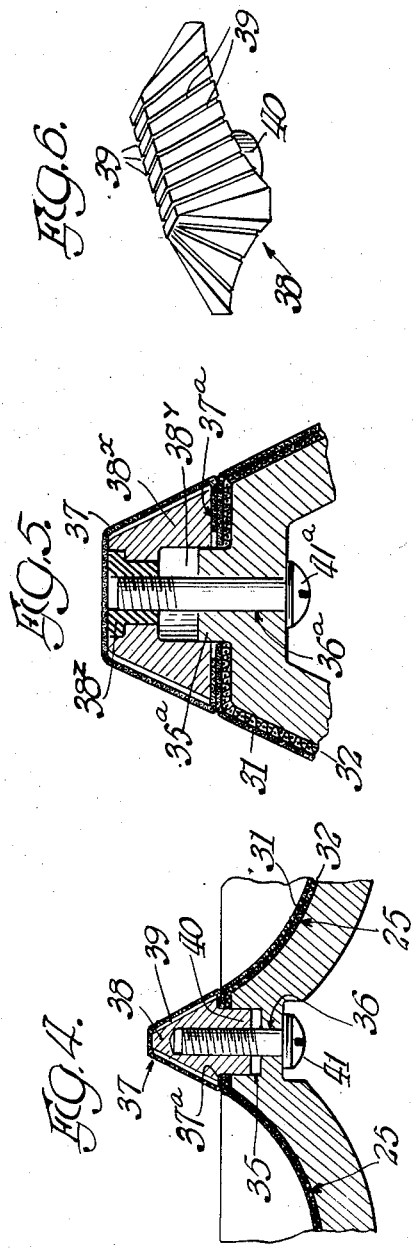

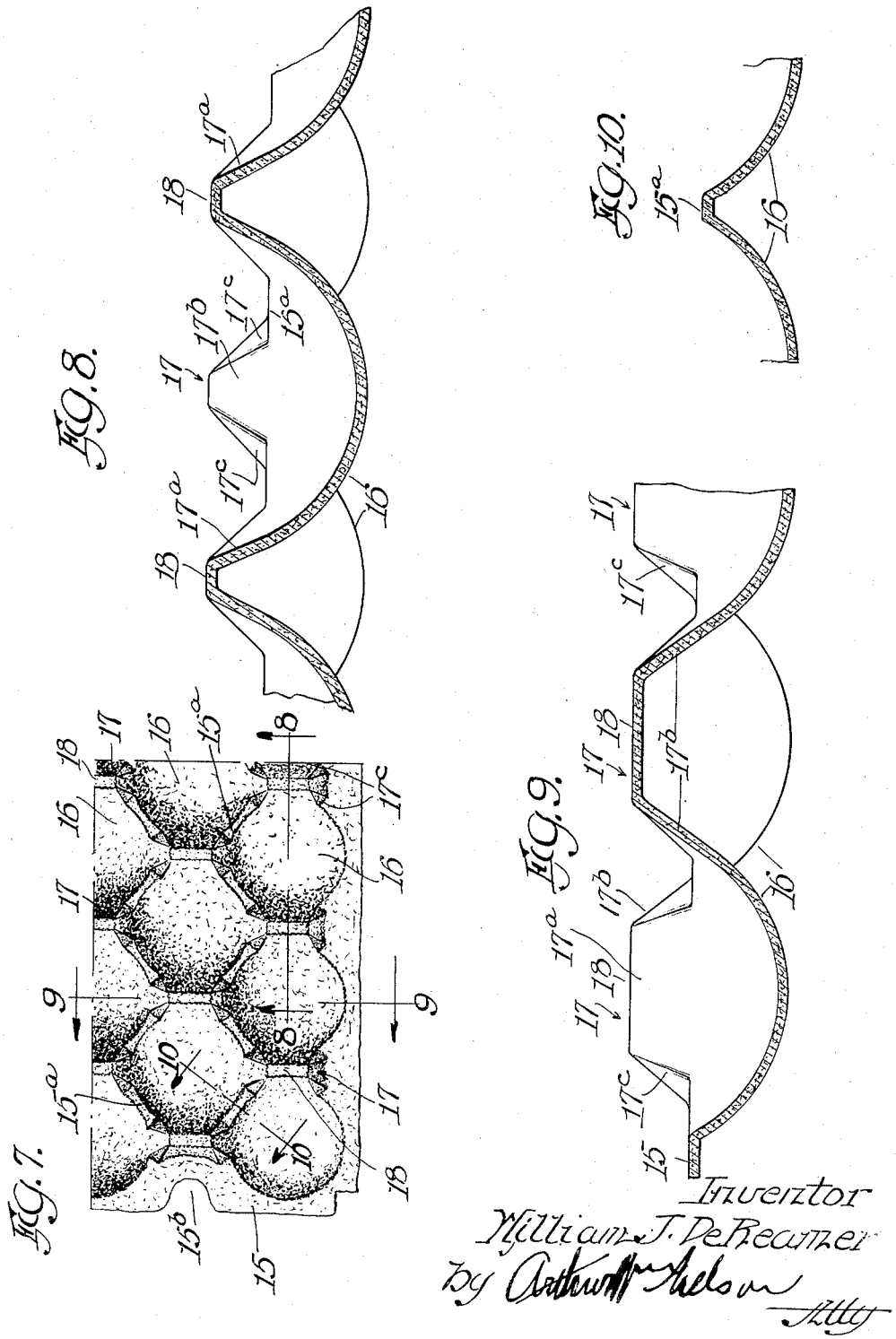

Patented July 1, 1952

2,601,815

UNITED STATES PATENT OFFICE 2,601,815

DIE FOR MOLDING PULP ARTICLES

William J. De Reamer, Crown Point, Ind., assignor to Mapes Consolidated Manufacturing Company, Griffith, Ind., a corporation of Delaware Application December 14, 1945, Serial No. 635,076

11 Claims. (Cl. 92—54)

This invention relates to improvements in dies for molding pulp articles and it consists of the matters hereinafter described and more particularly pointed out in the appended claims.

Dies of this kind usually include a rigid foraminous die body the molding face of which may have depressions in and projections thereon and this face is covered by a foraminous facing sheet contoured to match and fit upon the molding face of the die body. The facing sheet is generally made from a piece of relatively fine mesh brass or copper screen. In some instances, where the depressions in and projections on the molding face are shallow in depth and spaced widely apart, it is practical to make the facing sheet of a single piece of such mesh and distort or stretch certain areas thereof to fit the depressions and projections of the die body.

However, in many instances it is desired to make molded pulp articles requiring the use of a die having closely adjacent relatively deep depressions and high projections. In such dies it is not practical to form a single piece of mesh to the contour of the molding face of the die body because this would require a distortion or stretching of the mesh beyond its elastic limit with the result that the facing sheet is cracked or broken and unfit for use for its intended purpose.

The present invention is more particularly concerned with a die for molding pulp articles that include a sheet-like body with closely arranged relatively deep depressions and high projections. One of the objects of the invention is to provide a simple and inexpensive pulp molding die, the facing sheet of which includes foraminous hollow projections which are separate from the facing sheet itself, thus avoiding the necessity of so distorting parts of the facing sheet itself as to rupture the same.

A further object of the invention is to provide in a die for thus purpose, hollow projections on, but separate from, the facing sheet thereof and which are internally supported in a manner permitting free passage of water therethrough.

The above mentioned objects of the invention, along with others, together with the several advantages thereof will more fully appear as the specification proceeds.

In the drawings:

Fig. 2 is a transverse vertical sectional view through the body of the die as taken on the line 2—2 and on the scale of Fig. 1.

Fig. 3 is a detail transverse vertical sectional view through a part of the die as taken on the line 3—3 of Fig. 1 and on an enlarged scale.

Fig. 4 is a detail vertical sectional view through a part of the die as taken on the line 4—4 and on the scale of Fig. 3.

Fig. 5 is a detail vertical sectional view showing a modification of a detachably mounted hollow projection forming part for the die and which will be described in more detail later.

Fig. 6 is a perspective view of a supporting post embodied in the structure appearing in Figs. 3 and 4.

Fig. 7 is a plan view of a corner fragment of the molded pulp article or pack produced by the die and on the scale of Fig. 1.

Figure 1:
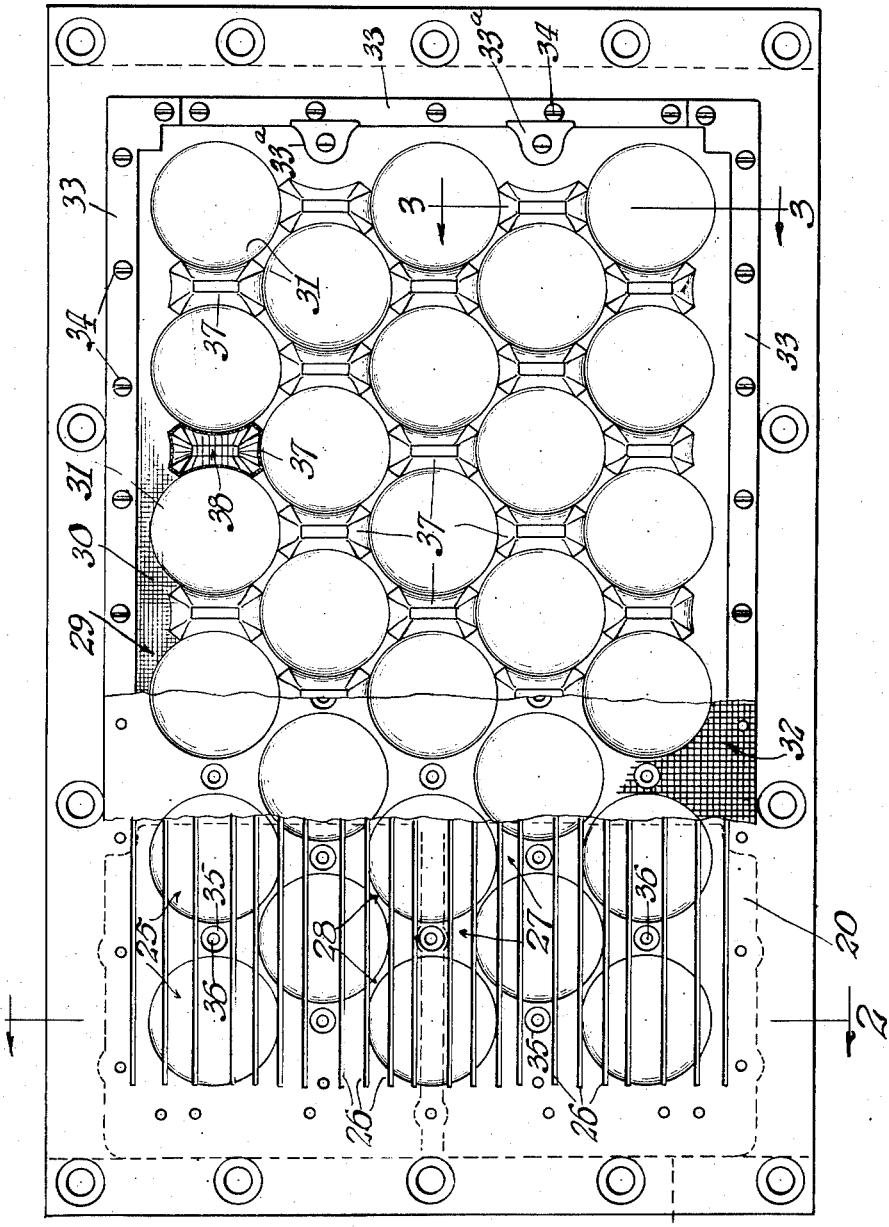
Fig. 1 is a view in elevation of the working face of a die for molding pulp articles embodying the perferred form of the invention, with a portion of the foraminous facing sheet and its foraminous backing sheet shown as broken away for illustrative purposes.

Figs. 8, 9 and 10 are detail views through parts of the article appearing in Fig. 7 as taken on the lines 8—8, 9—9 and 10—10 respectively of said Fig. 7 and on the scale of Fig. 3.

In general when the die is to be used in molding pulp articles of the kind above mentioned, it will include a rigid but foraminous die body. The working face of said body is formed with a series of closely adjacent pocket like depressions or cavities. The other face is formed to receive a closure plate in a manner defining a hollow space for connection with the suction side of the pulp molding machine of which the die or dies form a part.

The working face of the die is covered with a foraminous facing sheet preferably made of a relatively fine mesh brass or copper wire screen and parts or areas thereof are formed to fit the depressions or cavities in the die body. When desired a foraminous sheet of coarser wire mesh may be disposed between the working face of the die body and the facing sheet to back up or support the facing sheet against the suction pressure imposed upon it in use.

The depressions or cavities mentioned which form the commodity receiving pockets in the molded pulp article produced by the die are closely adjacent each other and this leaves only a minimum amount of space or area between them. The reason therefor is to provide as many pockets as possible in an article of limited area and thus conserve shipping space for the commodity packed in the articles.

This close arrangement of the depressions or cavities in the die body and in the facing sheet, as well as in the backing sheet when the latter is used in the dies, does not leave sufficient areas intermediate or between the depressions in the facing sheet from which to make integral hollow parts projecting from the other side of the sheet and of such size or height as to be of any practical use. In many instances it is desired that certain side surface portions of these projections form continuations of side surface portions of the depressions and the intermediate areas mentioned are too small in size to permit drawing, stretching or distorting the same to produce said projections.

Therefore, the foraminous projections are made of separate pieces of the same kind of wire screen, formed to desired shape, as that from which the facing sheet is made. These separately formed pieces are each mounted on an internal supporting element shaped to the areas mentioned and marginal portions of the screen are turned under the base of the element before the resulting assembly is engaged on the desired areas and which elements are formed for drainage. Means are provided that are operable from the rear of but pass through underlying parts of the die body to draw the base ends of said supporting elements closely up against the facing screen covering said areas and this clamps said elements in the assembly and at the same time clamps the inturned margins of the screens in place.

The improved die is herein illustrated and described as for making a molded pulp article such as illustrated in Figs. 7, 8, 9 and 10 of the drawings and which includes a generally rectangular body sheet 15 with a plurality of relatively closely adjacent article receiving pockets 16 therein arranged in longitudinally and transversely extending, intermediate and alternate rows. On those areas of the body sheet between the pockets 16—16 in the rows thereof are upstanding hollow projections or posts 17—17, the flat tops 18 of which are elongated transversely of the body sheet.

In Figs. 8, 9 and 10 are illustrated, in full size scale, detail sectional views through the finished molded pulp article which is made of stock about 3/32 of an inch thick. The pockets 16 are about 3/4 of an inch deep and about 2 1/2 inches in diameter. These pockets are spaced on centers about 3 3/8 inches apart in the longitudinal rows and are spaced on centers about 2 11/64 inches apart in the transverse rows. It is thus obvious that the pockets are arranged as close together as possible to obtain as many pockets in an article of a given size which in the present instance would approximate one about 20 inches long and 12 1/4 inches wide. With this arrangement described the article contains 28 pockets.

It is to be noted that side portions 17a and end portions 17b of said projections 17, which are about 1/2 of an inch high, form continuations of parts of the sides of the pockets 16. Corners 17c of three side shape extend upwardly and inwardly from parts 15a of the body sheet between the pockets to meet the corners of the flat tops 18 of said projections. The parts 15a of the body 15 between adjacent pockets form hollow spaced apart ribs that run diagonally of the body and materially assist in rigidifying the article as a whole.

An article of this kind is illustrated and described in the Friday Patent #2,351,754 of June 20, 1944, and is primarily used as a pack for choice fruits and vegetables.

Referring now in detail to the construction of the die by means of which the molded pulp article before described is made and particularly to Fig. 1, the improved die includes therein a rectangularly shaped die body 20. Said body is preferably made of cast metal of such thickness as to be quite rigid. The side and end margins of the body are made as a continuous flange 21 to which one side of a plate 22, of the area of said body, is fixed to form with the body a suction chamber 23 on that side of the body opposite its working face 24. Only a fragment of the plate 22 appears in Fig. 2.

This working face is flat and even and in that area of the body within the flange 21 said face is provided with a plurality of rows of longitudinally and transversely extending alternate and intermediate depressions or cavities 25—25. Each depression has the shape of a part of the sphere and is circular in plan.

The depressions 25 in the longitudinal rows are spaced closer together than the depressions in the transverse rows so as to leave spaces or areas 27 of a somewhat "hour glass" shape between said depressions as best appears in Fig. 1. Considered in planes diagonally of the body and passing through the axes of adjacent depressions, marginal parts of adjacent depressions are so closely spaced as to constitute relatively narrow areas 28 that connect the areas 27—27 together.

The body 20 is so made that water may pass therethrough and one convenient way in which to do this is to provide longitudinal slits 26—26 therein and which best appear in Figs. 1, 2 and 3.

That part or area of the working face of the body, within the confines or outline of the flange 21 is covered by a foraminous facing sheet 29 (see Fig. 1) preferably of a relatively fine brass or copper wire of about 65 mesh. This facing sheet includes a flat body portion 30 and certain areas thereof are formed with depressions 31—31 that fit within the depressions 25 in the body, other portions of the body being flat and conforming to and covering the flat portions 27 and 28 respectively of the working face 24 of the die body.

Disposed between said working face of the die body and the facing sheet 29 is a foraminous backing and bracing sheet 32 (see Figs. 1 and 3) of brass or wire copper mesh and which is coarser or heavier than that of the facing sheet.

The superposed margins of the facing sheet 30 and its backing sheet 32 are secured to the die body by strips 33—33 preferably made of brass or copper. Screws 34 pass through these strips as well as through the margins of the facing and backing sheets to have a threaded engagement in the die body itself.

When it is desired to provide finger recesses 15b in certain of the margins of the body 19 of the article as appears in Fig. 7, corresponding areas in the facing sheets and backing sheet are blocked out by the members 33a (see right hand end of Fig. 1) secured in place by screws similar to the screws 34.

Centrally in each area 27 of the die body a recess 35 is provided that opens at one end through the working face of the die body and communicating therewith is a hole 36 which opens through that face of the die body opposite said working face.

Both the facing sheet 29 and its backing sheet 32 are provided with holes therein each of the same diameter as and arranged to register with the associated recess 35.

Disposed upon each portion of the facing screen that covers a portion 27 of the die body is a frustro-pyramidally shaped foraminous member 37 made of the same mesh screen as that of the facing sheet. This member which forms the projections 17 in the finished molded pulp article, in itself does not possess sufficient strength to resist the collapsing effect of the suction pressure used in the pulp molding machine of which the die as a whole forms a part. Therefore each member 37 is internally supported as by a similarly shaped member 38 which best appears in perspective in Fig. 6. The external surface of this member is provided with water drainage grooves 39 and projecting from the flat base thereof is a boss 40 that fits in the associated recess 35 in the die body.

It is pointed out that the sides and ends of the member 37 before it is assembled with an associated supporting member 38, are somewhat longer axially than the sides or ends of the member 38 so that marginal base portions 37a of the members 37 project or extend beyond the base of the supporting member. These projecting marginal base portions 37a are then turned or bent in under marginal base portions of the member 38, as best appears in Figs. 3 and 4.

After the parts 37—38 have been thus far assembled, the assembly is thus disposed or engaged upon the die body with the boss 40 of the member 38 extending into an associated recess 35. A screw 41 is then inserted through a hole 36 from that face of the die body opposite its working face 24 and this screw is threaded into the member 38 through its boss 40. When this screw is drawn up tight, it pulls the assembly constituted by the members 37—38 toward the body, thus clamping the inturned margin 37a of each member 37 between the base of the backing member 38 and that part of the facing sheet covered thereby. Thus the inturned margin of each member 37 is securely clamped in place without leaving any rough edges to produce fins in the finished article.

It is pointed out at this time that the sides and ends of each member 37 are so disposed with respect to adjacent parts of the depressed portions 31 of the face sheet as to blend or merge into each other so that one forms a continuation of the other.

In Fig. 5 there is illustrated a modified way of attaching the assembled parts 37—38 in place. In said figure the body of the die is provided in the area 27 on its working face 24 with a boss 35a and centrally of which is a hole 36a. The member 37 remains the same as before but its internal support which is indicated at 38x is provided in its base with a recess 38y that fits the boss 35. In the top of said member 38x is fixed an internally threaded shouldered bushing 38z into which a screw 41x extends as best appears in Fig. 5. When this screw is turned up tight, it acts to pull the member 38x toward the body in the same way as in the structure shown in Figs. 3 and 4.

It is pointed out that by means of the construction described there has been provided a molding die for pulp articles that includes foraminous projections made separate from but so attached to the facing sheet of the die as to function as an integral part thereof. Thus it is not necessary to distort those areas of the facing sheet that can least stand the same.

Should any one of the foraminous members 37 become ragged from wear and show wire ends that would interfere with a free stripping or take off or transfer of the articles from the die, the same may be removed after removing the associated screw 41 and replaced by another one.

By the method and means described it is possible to provide dies in which the main part is composed of a single piece or sheet and in which other parts are formed so that they may be easily affixed. The resulting die is thus of relatively simple form and may be produced at relatively low cost.

While in describing the invention, I have referred in detail to the form and construction of the parts involved therein, and the same is to be considered only in the illustrative sense so that I do not wish to be limited thereto except as may be specifically set forth in the appended claims.

I claim as my invention:

1. In a die for forming molded pulp articles, a die body having water passages therethrough and a working face, a plurality of cavities in said body inwardly of the plane of said face and separated from each other by portions of said face, foraminous sheet means upon said working face and conforming to the contour of said cavities and conforming at least in part to said portions of said working face between said cavities, and a plurality of foraminous members separate from said foraminous sheet means and from each other and disposed in spaced relation upon and attached to associated portions of said face and extending outwardly of the plane of said face.

2. In a die for forming molded pulp articles, a die body having water passages therethrough and a working face, a plurality of cavities in said body inwardly of the plane of said face and separated from each other by portions of said face, foraminous sheet means upon said working face and conforming to the contour of said cavities and conforming at least in part to said portions of said working face between said cavities, a plurality of foraminous members separate from said foraminous sheet means and from each other and disposed in spaced relation upon associated portions of said face and extending outwardly of the plane of said face, and means affording drainage as well as internal support and attachment for each member relative to said die body.

3. In a die for forming pulp articles, a die body having water passages therethrough and a working face, a plurality of cavities in said body inwardly of the plane of said face and separated from each other by portions of said face, foraminous sheet means upon said working face and conforming to the contour of said cavities and conforming, at least in part, to said portions of said working face between said cavities, a plurality of foraminous members separate from said foraminous sheet means and from each other and disposed in spaced relation upon associated portions of said face and extending outwardly of the plane of said face, and means affording internal support and drainage for each member and including parts operable from that face of the die body opposite said working face for detachably securing said means to the die body.

4. In a die for forming molded pulp articles, a die body having water passages therethrough and a working face, a plurality of cavities in said body inwardly of the plane of said face and separated from each other by portions of said face, foraminous sheet means upon said working face and conforming to the contour of said cavities and conforming, at least in part, to said portions of said working face between said cavities, a plurality of foraminous members separate from said foraminous sheet means and from each other and disposed in spaced relation upon associated portions of said face and extending outwardly of the plane of said face, and means affording drainage, as well as an internal support and attachment for each member relative to said die body, marginal portions of each foraminous member being turned under the base of said last mentioned means and clamped between said base and said foraminous means on said other portions of said face.

5. In a die for forming molded pulp articles, a die body having water passages therethrough and a working face, a plurality of cavities in said body inwardly of the plane of said face and separated from each other by portions of said face, foraminous means upon said working face and conforming to the contour of said cavities and, at least in part, to said portions of said working face between said cavities and including at least a relatively coarse heavy wire mesh sheet engaged directly upon the surfaces of said cavities and of said portions of the working face between them and a finer and lighter wire mesh sheet engaged upon said first mentioned sheet and reinforced thereby, and a plurality of internally supported foraminous members separate from said sheets of said means and from each other and disposed in spaced relation upon and attached to said portions of said sheets upon said portions of said working face and extending outwardly of the plane of said face.

6. In a die for forming molded pulp articles, a die body having water passages therethrough and a working face, a plurality of cavities in said body inwardly of the plane of said face and separated from each other by portions of said face, foraminous means upon said working face and conforming to the contour of said cavities and conforming, at least in part, to said portions of said working face between said cavities, a supporting member enclosed within and formed for the drainage of water passing through each foraminous means, each supporting member and said die body having an interengaging boss and recess arrangement, and a threaded member extending through the die body from the other side thereof and through said arrangement and operative to attach said supporting member and associated foraminous means to said die body.

7. In a die for forming molded pulp articles, a die body having water passages therethrough and a working face, a plurality of cavities in said body inwardly of the plane of said face and separated from each other by portions of said face, foraminous means upon said working face and conforming to the contour of said cavities and conforming, at least in part, to said portions of said working face between said cavities, a supporting member enclosed within and formed for the drainage of water passing through each foraminous means, each supporting member having a base under which marginal portions of the associated foraminous means are engaged, portions of the outline of said base being contoured to form continuations of adjacent cavities, and means for attaching each supporting member to the die body.

8. In a die for forming molded pulp articles, a die body having water passages therethrough and a working face, foraminous sheet means engaged upon and conforming to said working face, a plurality of foraminous members arranged in spaced relation upon predetermined areas of and extending outwardly from said foraminous sheet means, a device for each said foraminous member and having a base overlying an associated part of said foraminous sheet means, arranged within, affording drainage and internal support for the associated foraminous member, said foraminous member being secured against displacement from its associated device, and means for detachably securing each device to the die body with said base of the device clamping to said die body that part of said foraminous sheet means which it overlies.

9. In a die for forming molded pulp articles, a die body having water passages therethrough and a working face, foraminous sheet means engaged upon and conforming to said working face, a plurality of foraminous members arranged in spaced relation upon predetermined areas of and extending outwardly from said foraminous sheet means, a device for each said foraminous member and having a base overlying an associated part of said foraminous sheet means, arranged within, affording drainage and internal support for the associated foraminous member, said foraminous member having a portion underlying the base of its associated device, and means for detachably securing each device to the die body with its base clamping to the die body said underlying portion of the foraminous member and that part of said foraminous sheet means which it overlies.

10. In a die for forming molded pulp articles, a die body having water passages therethrough and a working face, foraminous sheet means engaged upon and conforming to said working face, a plurality of foraminous members arranged in spaced relation upon predetermined areas of and projecting outwardly from said working face, a device within each foraminous member and affording drainage and internal support therefor and having a base overlying an associated part of said foraminous sheet means, each device and associated area of the die body being formed to provide a boss and recess engagment, there being openings in said foraminous sheet means, one for each area and through which the boss at that area extends, each foraminous member having an inturned margin disposed between the base of the associated device and part of said sheet means thereunder, and a threaded member extending through the die body in each area and operatively engaged with a part carried by the associated device and operable from that face of the die body opposite its working face for drawing said device toward the body and cause said device to clamp the margin of the associated foraminous member against that part of the foraminous sheet means with which it is engaged.

11. In a die for forming molded pulp articles, a die body having water passages therethrough and a working face and in each of a plurality of areas thereof is a recess, foraminous sheet means upon and conforming to said working face and having openings therein, one for and registering with each recess, a plurality of foraminous members one for each recess and extending outwardly from said working face, a device within each foraminous member and affording drainage and internal support therefor and a part of each device being formed for engagement in an associated recess, each foraminous member having an inturned margin disposed between the base of the associated device and part of said sheet means thereunder, and means passing through the die body and having threaded engagement with a part carried by an associated device and operable from that face of the die body opposite said working face for drawing said device toward the die body and cause said device to clamp the margin of the foraminous member against that part of said sheet means with which it is engaged.

WILLIAM J. DE REAMER.

REFERENCES CITED

The following references are of record in the file of this patent:

UNITED STATES PATENTS

| Number | Name | Date |
|---|---|---|
| 183,444 | Ball | Oct. 17, 1876 |
| 1,161,125 | Gill | Nov. 23, 1915 |
| 1,796,794 | Koppleman | Mar. 17, 1931 |
| 2,081,740 | Farnham | May 25, 1937 |
| 2,159,638 | Schur | May 23, 1939 |
| 2,192,937 | Shepard | Mar. 12, 1940 |
| 2,359,201 | Chaplin et al. | Sept. 26, 1944 |
| 2,388,828 | Chaplin | Nov. 13, 1945 |